June 11, 1929.  W. H. STADT ET AL  1,717,072

REAR SIGHT MIRROR

Original Filed Sept. 8, 1925

INVENTORS:
WILLIAM H. STADT,
HARVEY MUYSKENS,
BY
ATTORNEY.

Patented June 11, 1929.

1,717,072

UNITED STATES PATENT OFFICE.

WILLIAM H. STADT AND HARVEY MUYSKENS, OF GLENDALE, CALIFORNIA.

REAR-SIGHT MIRROR.

Application filed September 8, 1925, Serial No. 55,009. Renewed November 12, 1928.

This invention relates to rear sight mirrors, and its relates particularly to a rear sight mirror comprising a mirror with which there is combined a novel glass shield.

A rear sight mirror of the class of which our invention concerns is fixed to an automobile in position to give the driver a view of the road in the rear of his machine. When driving at night, the glare of the head lights of the following vehicles produces reflections on the rear sight mirror which are very disagreeable to the driver, and the images cast on the mirror are very indistinct making it often impossible to discern the distances of the machines in the rear of his machine. Such glares are often noticeable on bright days.

It is an object of our invention to provide a rear sight mirror having means for greatly reducing glare, thus relieving the annoyance of the driver from this source and giving him a more accurate vision of the road at the rear. It is another object of our invention to provide a rear view mirror having a glare shield disposed in front of the mirror.

It is a further object of this invention to provide a rear sight mirror having a glare shield disposed in front of the mirror, which glare shield is movable out of this position for day use of the rear sight mirror.

It is a further object of this invention to provide special shield attachers for adjustably mounting the glare shield on a rear sight mirror.

Other objects and advantages of this invention will be made evident hereinafter.

Referring to the drawing in which we illustrate our invention,

Figure 1:
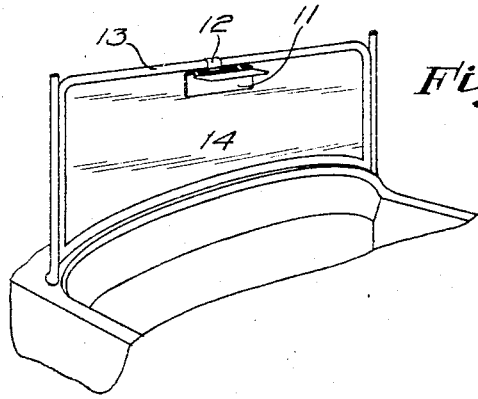
Fig. 1 is a diagrammatic view illustrating the utility of our invention.

The form of our invention shown in the drawings utilizes a rear view mirror 11 which is usually attached by means of an attachment bracket 12 to the upper part 13 of a windshield 14, this windshield 14 being that of any standard automobile.

Figure 2:
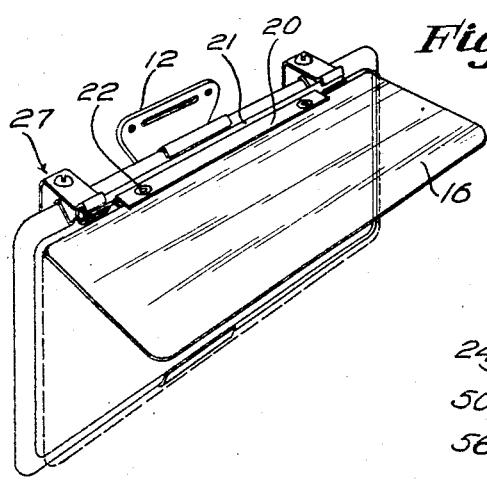
Fig. 2 is a perspective view showing a mirror incorporating the glare shield and other features of our invention.
Figure 3:
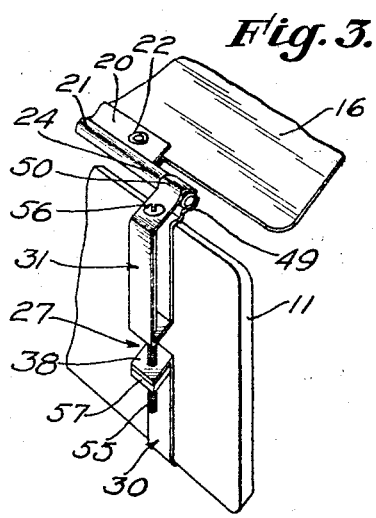
Fig. 3 is a fragmentary perspective view showing one of the shield attachers of our invention, this view being taken from the rear of the rear sight mirror.
Figure 4:
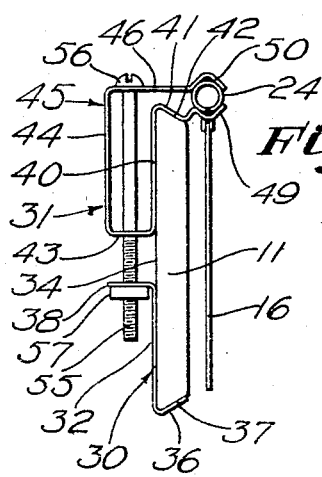
Fig. 4 is an end view of the mirror shown in Fig. 2, the glare shield being in this view disposed in front of the mirror.

As shown clearly in Figs. 2 to 4 inclusive, our invention provides a glare shield 16 which is mounted so that it may be positioned in front of the mirror 11, as shown in Fig. 4, and by dotted lines 17 of Fig. 2, and so that it may be swung into the position in which it is not in front of the mirror, such position being shown in full lines in Figs. 1 to 3, inclusive. The glare shield 16 is made from a thin sheet of celluloid or pyralin and is preferably light green in color. The shape of this glare shield is like that of the mirror 11 on which it is used.

The upper part of the glare shield 16 is secured between flanges 20 of a trunnion member 21 by suitable rivets or eyelets 22. This trunnion member 21 serves the purpose of reinforcing the upper part of the glare shield 16. The trunnion member 21 is formed to provide trunnions 24 which extend from each end thereof, as clearly shown in the drawings.

Our invention provides a novel form of shield attachers 27 for swingably mounting the glare shield 16 in place. As clearly shown in Figs. 3 and 4, these glare shield attachers comprise a lower clamp member 30 and an upper clamp member 31. The lower clamp member 30 has a vertical extending lower leg 32 which extends vertically along a back 34 of the mirror 11. From the lower end of this vertical lower leg 32 there extends a lower flange 36 which is adapted to engage a lower bevel edge 37 of the mirror 11. This lower flange 36 is made to conform to the lower edge 37 of the mirror 11 whether it be beveled or not. Extending rearwardly from the upper end of the vertical lower leg 32 is a lower lug 38. Each of the upper clamp members 31 has a vertical upper leg 40 which extends vertically along the back 34 of the mirror 11. At the upper end of the vertical upper leg 40 there is formed an upper flange 41 which extends into engagement with an upper beveled face 42 of the mirror 11. Extending rearwardly from the lower end of the upper leg 40 is an upper lug 43. Extending from the upper lugs 43 of each of the upper clamp members 31 is a vertical portion 44 of an arm 45. This vertical portion 44 of each of the arms 45 extends parallel to the vertical leg 40 of the upper clamp member 31 and terminates at a point higher than the upper edge of the mirror 11. Extending horizontally and forwardly from the upper ends of each of the arms 45 is a horizontal portion 46.

Formed on each of the upper flanges 41 of each of the upper clamp members 31 is a lower jaw 49 which provides a V-shaped channel, as shown. Formed at the forward end of each of the horizontally extending portions 46 is an upper jaw 50 which provides an inverted V-shaped channel. The lower and upper jaws 49 and 50 are arranged in pairs, and each pair of upper and lower jaws is adapted to receive one of the trunnions 24, these trunnions being journaled in the upper and lower channels, as clearly shown in the drawings.

With special reference to Fig. 4, the lower and upper clamp members 30 and 31 are each secured in place by a bolt 55. A head 56 of each of the bolts 55 engages a horizontal leg 46. The bolts 55 extend through the horizontal leg 46 of each of the arms 45 and through an upper lug 43 of each of the upper clamp members 31. Each of the bolts 55 extends through one of the lower lugs 38 and has a nut 57 threaded on the lower end thereof. The nuts 57 may be advanced upwardly on the bolts 55 and clamp the lower lugs 38 and the horizontal arms 56 toward each other. This has the effect of clamping the clamp members 30 and 31 securely to the mirror 11, the clamping force being transferred to the upper clamp member 31 through the arm 45. This also has the effect of pressing the upper jaws 50 toward the lower jaws 49. This places resilient pressures upon the trunnions 24, thus supplying sufficient friction to support the glare shield in any desired position.

In using our invention during day driving and when there is no glare, the glare shield 16 is positioned as shown in Figs. 1 to 3 inclusive, the glare shield being extended substantially horizontal and not in front of the mirror 11. When driving at night or when there is glare, the glare shield 16 is moved into vertical extension into a position in front of the mirror 11, as shown in Fig. 4, and as indicated by the dotted lines 17 in Fig. 2. All light passing to the mirror 11 from the rear of the vehicle on which our invention is used must pass through the glare shield 16. This glare shield is of such a character that it effectively reduces glares of the head lights, windshields and other reflections of machines in the rear, thus eliminating any annoyance or irritation to the driver of the vehicle which could be produced by such reflection. By a reduction and a substantial elimination of the glares, it is possible for the driver to more accurately discern the objects at his rear and to more accurately observe their distances from his machine.

The novel shield attachers 27 of our invention make it possible for us to very cheaply produce the glare shield attachment of our invention, and these attachers are especially designed so that our invention may be very quickly installed upon any rear sight mirror. It is general practice for us to supply the glare shield 16 and the shield attachers 27 to motorists who already possess rear sight mirrors 11. The glare shields 16 are generally provided quite large so that they may be trimmed to the proper size, the rear sight mirrors varying considerably in size.

We claim as our invention:

1. In combination: a mirror; a pair of shield attachers attached to said mirror, each of said attachers comprising a lower clamp member adapted to engage said mirror, an upper clamp member adapted to engage said mirror, a lower flange formed on said lower clamp member, said upper clamp members each comprising an upper leg extending along the back of said mirror, a flange at one end of said upper leg for engaging the upper edge of said mirror, and a lug extending rearwardly from said vertical leg; a pair of arms, each of said arms being formed on one of said upper clamp members and each comprising a vertical portion extending in back of said mirror, and a horizontal portion extending from the upper end of said vertical portion above said mirror; a pair of lower jaws, each of which is formed on one of said flanges of said upper clamp members; a pair of upper jaws, each of which is formed on one of said horizontal portions of said arms, each of said upper jaws being adapted to cooperate with one of said lower jaws; a bolt for pressing said upper and lower jaws together and for clamping said upper and lower clamp members on said mirror; and a glare shield having trunnions which are engaged by said pair of upper and lower jaws of each of said shield attachers, said glare shield being movable from and into a position in front of said mirror.

2. In combination: a mirror; a pair of lower clamp members each comprising a lower leg extending along the back of said mirror, a flange extending from said lower leg and engaging the lower edge of said mirror, and a lug extending rearward from said lower leg; a pair of upper clamp members each comprising an upper leg extending along the back of said mirror, a flange extending from said upper leg and engaging the upper edge of said mirror, a lug extending rearwardly from said upper leg, an arm extending from said lug, said arm having a vertical portion and a horizontal portion, a lower trunnion journal jaw provided upon said flange, and an upper trunnion journal jaw provided upon said horizontal arm portion; a glare shield; a trunnion member secured to said glare shield, having a pair of trunnions, each of said trunnions being supported in a pair of said upper and lower jaws; and a pair of bolts, each of said bolts being adapted to press one of said upper jaws toward an adjacent lower jaw and to fix one of said upper and said lower clamp members to said mirror, each of said bolts engaging said horizontal portion of one of said arms and said lug of one of said lower clamp members.

3. In combination: a mirror; a glare shield adapted for placement in front of said mirror; trunnions provided upon said glare shield; clamps; jaws provided upon said clamps for journalling said trunnions; and means for causing said clamps to grip said mirror, said means causing said jaws to exert a pressure upon said trunnions.

4. In combination: a mirror; a glare shield adapted for placement in front of said mirror; trunnions provided upon said glare shield; and clamps gripping said mirror, each of said clamps having a lower mirror gripping member, an upper mirror gripping member, a lower trunnion jaw rigidly formed upon said upper mirror gripping member, an upper trunnion jaw yieldably formed upon said upper mirror gripping member and means for concurrently drawing said lower and upper gripping members together upon said mirror and drawing said upper and lower trunnion jaws together upon a trunnion of said glare shield.

In testimony whereof, we have hereunto set our hands at Los Angeles, California, this 2nd day of September, 1925.

WILLIAM H. STADT.
HARVEY MUYSKENS.

CERTIFICATE OF CORRECTION.

Patent No. 1,717,072.                                                     Granted June 11, 1929, to

WILLIAM H. STADT ET AL.

It is hereby certified that error appears in the printed specification of the above numbered patent requiring correction as follows: Page 2, line 92, claim 1, for the words "an upper" read "a vertical", and in line 94, for "upper" read "vertical"; and that the said Letters Patent should be read with these corrections therein that the same may conform to the record of the case in the Patent Office.

Signed and sealed this 30th day of July, A. D. 1929.

M. J. Moore, (Seal)                                        Acting Commissioner of Patents.